United States Patent
Kokubo et al.

[11] Patent Number: 5,311,503
[45] Date of Patent: May 10, 1994

[54] TERMINAL APPARATUS FOR FULL-DUPLEX DATA TRANSMISSION HAVING AN ECHO CANCELLER

[75] Inventors: Masaru Kokubo, Hachioji; Motohiro Kokumai, Yokohama, both of Japan

[73] Assignee: Hitachi, Ltd., Tokyo, Japan

[21] Appl. No.: 901,138

[22] Filed: Jun. 19, 1992

[30] Foreign Application Priority Data

Jun. 19, 1991 [JP] Japan ................... 3-147130

[51] Int. Cl.⁵ .................................. H04J 1/00
[52] U.S. Cl. ........................... 370/32.1; 379/411
[58] Field of Search ............. 370/32.1, 32; 379/410, 379/411; 364/724.16

[56] References Cited

U.S. PATENT DOCUMENTS

| | | | |
|---|---|---|---|
| 4,535,206 | 8/1985 | Falconer | 370/32.1 |
| 4,862,449 | 8/1989 | Hoejkens et al. | 370/32.1 |
| 4,947,425 | 8/1990 | Grizmala et al. | 379/410 |
| 5,029,167 | 7/1991 | Arnon et al. | 370/32.1 |
| 5,042,026 | 8/1991 | Koike | 370/32.1 |
| 5,084,865 | 1/1992 | Koike | 370/32.1 |

FOREIGN PATENT DOCUMENTS 276511 3/1988 European Pat. Off.
371567 6/1990 European Pat. Off.

Primary Examiner—Douglas W. Olms
Assistant Examiner—Chau T. Nguyen
Attorney, Agent, or Firm—Antonelli, Terry, Stout & Kraus

[57] ABSTRACT

A terminal apparatus for full duplex transmission of digital data comprising an echo canceler having FIR and IIR type filters and also comprising a filter convergence controller. The filter convergence controller performs its converging operation over both filters in a first duration of a communication starting sequence from the start of transmission from a local terminal to a remote terminal to the detection of the convergence of the echo canceller to a certain extent, stops the converging operation of the IIR type filter in a second duration of the communication starting sequence from the detection of the convergence to the detection of synchronization with the remote terminal, and again performs the converging operation of the both filters in a third duration after the detection of the synchronization.

12 Claims, 5 Drawing Sheets

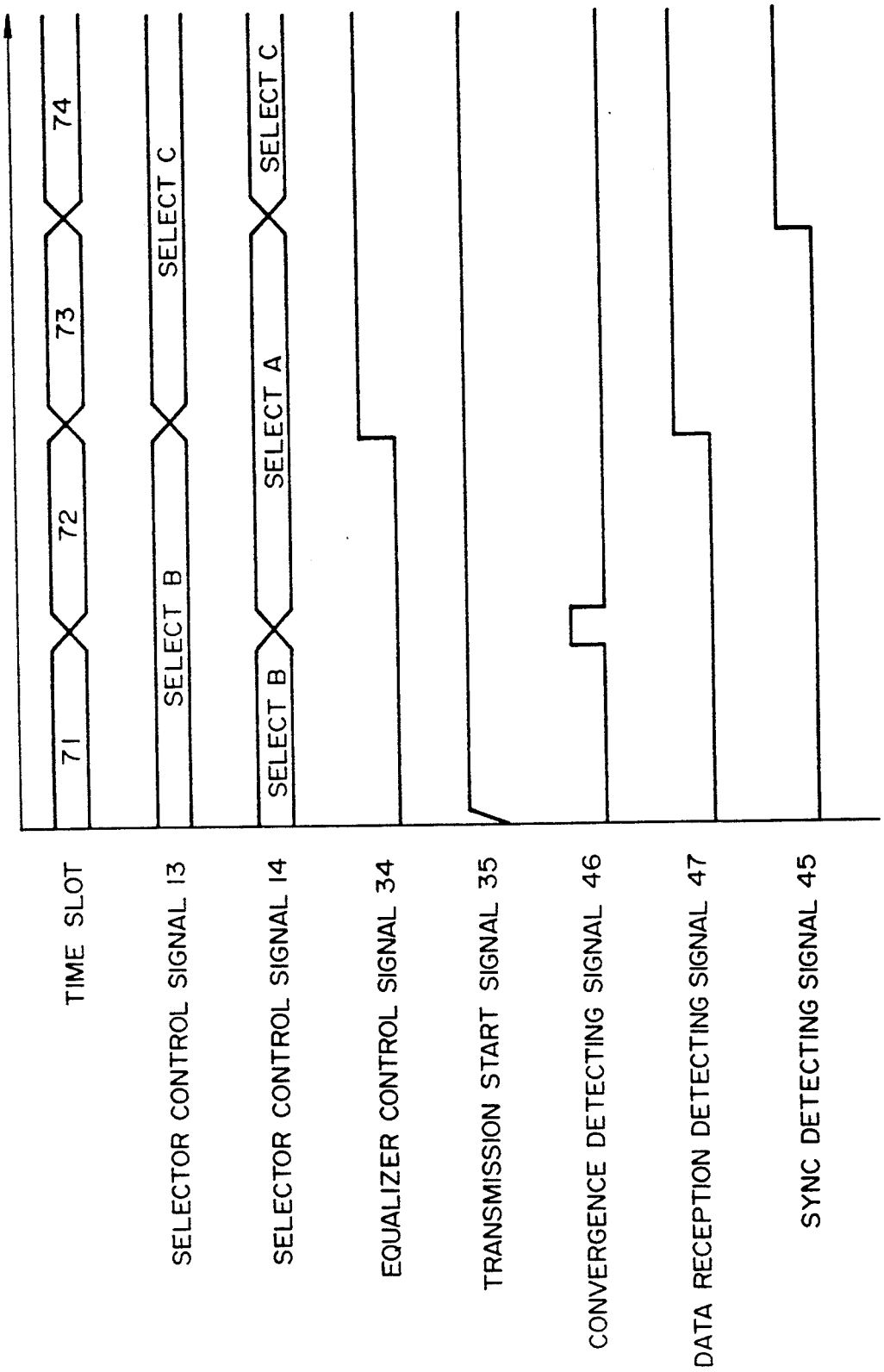

TERMINAL APPARATUS FOR FULL-DUPLEX DATA TRANSMISSION HAVING AN ECHO CANCELLER

BACKGROUND OF THE INVENTION

The present invention generally relates to a terminal apparatus for use in a digital subscriber line transmission system based on full-duplex transmission and, more particularly, to an adaptive type echo canceller in such a terminal apparatus. In particular, the present invention relates to a terminal apparatus which comprises an adaptive type echo canceller made up of a finite-duration impulse-response (FIR) filter and an infinite-duration impulse-response (IIR) filter.

In a digital subscriber line transmission system for full duplex transmission of digital data between terminal apparatuses through 2-wire transmission lines, each of the terminal apparatuses includes a transmitting line, a receiving line and a hybrid circuit for connecting the transmitting and receiving lines to an external full-duplex transmission line. When a transmission signal to be transmitted is applied to the hybrid circuit within the local terminal, this causes impedance mismatching of the hybrid circuit, thus generating an echo that is undesirably bypassed to the receiving line. To avoid this, there has been suggested such a technique that an echo replica is generated based on the transmission signal of the local terminal to cancel the echo appearing on the receive line as disclosed in U.S. Pat. No. 4,131,767 (issued on Dec. 26, 1978). In this prior art, an echo canceller comprises a finite-duration impulse-response (FIR) filter, and tap coefficients of a plurality of taps of the filter are converged on the basis of an error signal which is generated based on a receiving line signal received from a remote party terminal.

Also disclosed in U.S. Pat. No. 4,868,874 (issued on Sep. 19, 1989) is an arrangement which comprises a combination of an FIR type filter for suppressing an echo impulse response of a short time constant and an IIR type filter for suppressing an echo impulse response of a long time constant, i.e., an echo tail. Another arrangement is disclosed in an article in IEEE Globe'Com '88, 25.2, pp. 778–782, entitled "Design Techniques And Performance of An LSI-Based 2B1Q Transceiver" (1988) that an FIR type filter comprises a plurality of stages of delay circuits connected in cascade and a tap output obtained from the last stage of delay circuit is used as an input of an IIR type filter.

SUMMARY OF THE INVENTION

In a full-duplex transmission system of digital data, adjustment of local parameters of a local terminal including the sampling phase of a received signal is carried out according to the transmission line delay of a transmitted signal from a remote terminal. Since the remote terminal to communicate with is not fixed but selective, the local parameters must be automatically adjusted each time a series of data communications with the remote terminal are started. FIR and IIR type filters making up an echo canceller are also provided with means for automatically converging these filters. That is, adaptive filters are employed as these filters.

Thus, the convergence characteristics of the IIR type filter will be important. Since the IIR type filter has a long time constant impulse response, when the filter parameters are unsuitably set, it requires a long time to attain the correct convergence. When starting the data communication with the remote terminal, the IIR filter tends to be disturbed with disturbances, such as a start of the reception of a signal transmitted from the remote terminal or generation of a discrimination error during the adjustment of sampling phase of a receiving line signal received from the remote terminal. Since the discrimination error of the receiving line signal is generated even when the echo canceller is not converged and thus its echo canceling is insufficient, such disturbance generation is caused in a vicious circle, which makes impossible of the attainment of convergence of the IIR type filter for ever.

In the echo canceller disclosed in U.S. Pat. No. 4,868,874, the FIR type filter performs its converging operation at all times whereas the IIR type filter performs its converging operation only when a specific pattern is detected in transmission symbols to be transmitted from the local terminal. With this arrangement, however, the disturbance preventing effect and the effect of quickly converging the echo canceller are both insufficient. Further, this arrangement is defective in that this arrangement can be applied only to a data transmission system that uses such codes with regularity, e.g., based on alternate mark inversion (AMI) coding. The AMI coding, which has a regularity in code generation, has a redundancy and its code frequency spectrum extends to a high frequency band. For this reason, when AMI codes are transmitted through such a transmission line having a small transmission capacity as a telephone subscriber line, the data rate is reduced.

It is an object of the present invention to provide a full-duplex data transmission terminal apparatus which can suitably prevent disturbance mixing at the time of starting a data communication and can quickly converge an echo canceller.

Another object of the present invention is to provide a full-duplex data transmission terminal apparatus which can suitably converge an echo canceller even when coding having no redundancy and having a narrow frequency spectrum band is employed.

In accordance with an aspect of the present invention, there is provided a data transmission terminal apparatus which comprises an echo canceller including FIR and IIR type filters and a filter convergence controller, and in which the filter convergence controller performs its converging operation of both of the filters in a first duration of a data communication starting sequence of a local terminal from the start of transmission from the local terminal to a remote terminal to the detection of convergence to a certain extent. The converging operation of the IIR type filter ends in a second duration of the sequence from the detection of the convergence to the detection of synchronization with the remote terminal, and the filter convergence controller once again performs the converging operation of both filters in a third duration of the sequence after the detection of the synchronization. More specifically, both the FIR and IIR filters are converged in accordance with a first error signal indicative of a difference between an echo on a receiving line and a echo replica generated by the echo canceller in the first duration; the convergence of at least the IIR filter is stopped in the second duration; and the convergence of both the FIR and IIR filters is converged in accordance with a second error signal corresponding to the first error signal subjected to a correction with use of an estimated value of a far end signal obtained from a discrimination value of the receive signal in the third duration after the synchronization detection.

The present invention further comprises signal reception detecting means for detecting arrival of a transmitting signal from the remote terminal to the local terminal in the second duration to converge the FIR filter according to the first error signal in the second duration and before detection of the signal arrival or according to the second error signal in the second duration and after the detection of the signal arrival.

With such an arrangement, shifting of the parameters of the IIR filter to their optimum values by a disturbance caused by a status change from a status in which only an echo of the transmitting signal of the local terminal is present on the receiving line to a status in which a transmitting signal of the remote terminal is arrived thereat or by a disturbance caused by a discrimination error of the receive data until the establishment of the synchronization is prevented. Further, since both of the FIR and IIR type filters are converged to a certain extent in the initial stage of the data communication starting sequence, the echo canceller can be suitably converged in a short time.

The FIR type filter, which comprises a plurality of delay circuits connected in cascade, is arranged to multiply outputs of the delay circuits by respective tap coefficients to obtain a plurality of tap outputs and to add the plural tap outputs together. Meanwhile, the IIR type filter comprises a recursive filter which receives, thereon, one of the plurality of tap outputs. Accordingly, the convergence of the FIR type filter is carried out through the successive correction of the tap coefficients of particular ones of the plural tap outputs not connected to the IIR filter while the convergence of the IIR type filter is carried out through the successive correction of the tap coefficients of particular ones of the plural tap outputs connected to the IIR filter.

Other features of the present invention will become obvious from the following explanation with reference to the accompanying drawings.

BRIEF DESCRIPTION OF THE DRAWINGS

FIG. 5 is a timing chart for explaining the status control sequence of the embodiment.

DESCRIPTION OF THE PREFERRED EMBODIMENTS

An embodiment of the present invention will be explained with reference to FIGS. 1 to 5.

Figure 2:
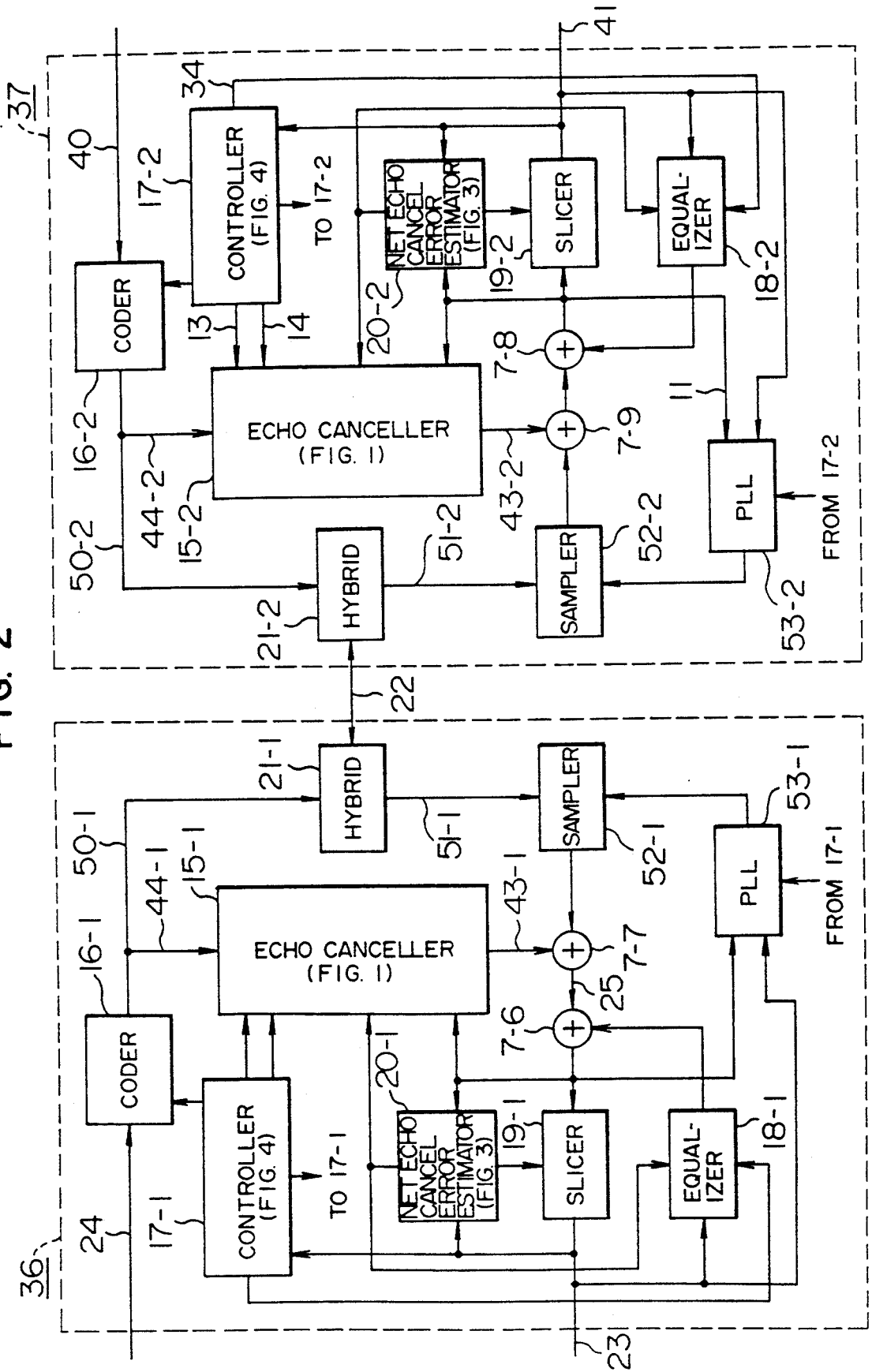
FIG. 2 is a block diagram of the transmission system of the embodiment.

Referring first to FIG. 2, there is shown an arrangement of a subscriber line data transmission system in accordance with an embodiment of the present invention. In the drawing, a local terminal apparatus 37 selects one, 36 in the drawing for example, of remote terminals connected to a subscriber telephone line 22. Thus, full-duplex transmission is carried out between the two terminals. The two terminal apparatuses are substantially the same and thus explanation will be made as to only the local terminal apparatus 37.

A hybrid 21-2, which is called a 2-wire/4-wire converter in a narrow sense, connects transmission and reception lines 50-2 and 51-2, respectively of the local terminal to the subscriber telephone line 22. A coder 16-2 converts binary data received at the local terminal apparatus 37 into an encoded signal (for example, based on 2B1Q or 4B3T coding) to be transmitted onto the telephone line. In the illustrated embodiment, the 2B1Q coding determined by the American National Standards Institute (ANSI) is employed. The encoded signal is sent through the 2-wire/4-wire converter 21-2 to the telephone line and also sent directly to an echo canceller 15-2. The echo canceller 15-2 suppresses part of the encoded signal (to be transmitted from the local terminal to the remote terminal) bypassed to the receiving side of the local terminal caused by the impedance mismatching of the 2-wire/4-wire converter 21-2. A sampler 52-2 samples a signal on the reception line 51-2 at sampling timing controlled in phase by a phase locked loop circuit 53-2. An equalizer 18-2 suppresses interference between codes in the encoded signal received from the remote terminal 36 to generate a discriminatable signal. A slicer 19-2 discriminates the discriminatable signal equalized by the equalizer 18-2 and converts it into the original binary data. A net echo cancel error estimater 20-2 extracts that part of the signal which the equalizer 18-2 or echo canceller 15-2 failed to suppress and generates an error signal for use of internal coefficient correction of the echo canceller 15-2 or equalizer 18-2. A controller 17-2 controls a data communication starting sequence. With such an arrangement, an echo in transmitted data prevents the generation of an error in the discrimination of the receive signal.

On the other hand, the remote terminal 36 also performs substantially the same processing operation. A signal received at the remote terminal is reproduced as a digital data.

Figure 1:
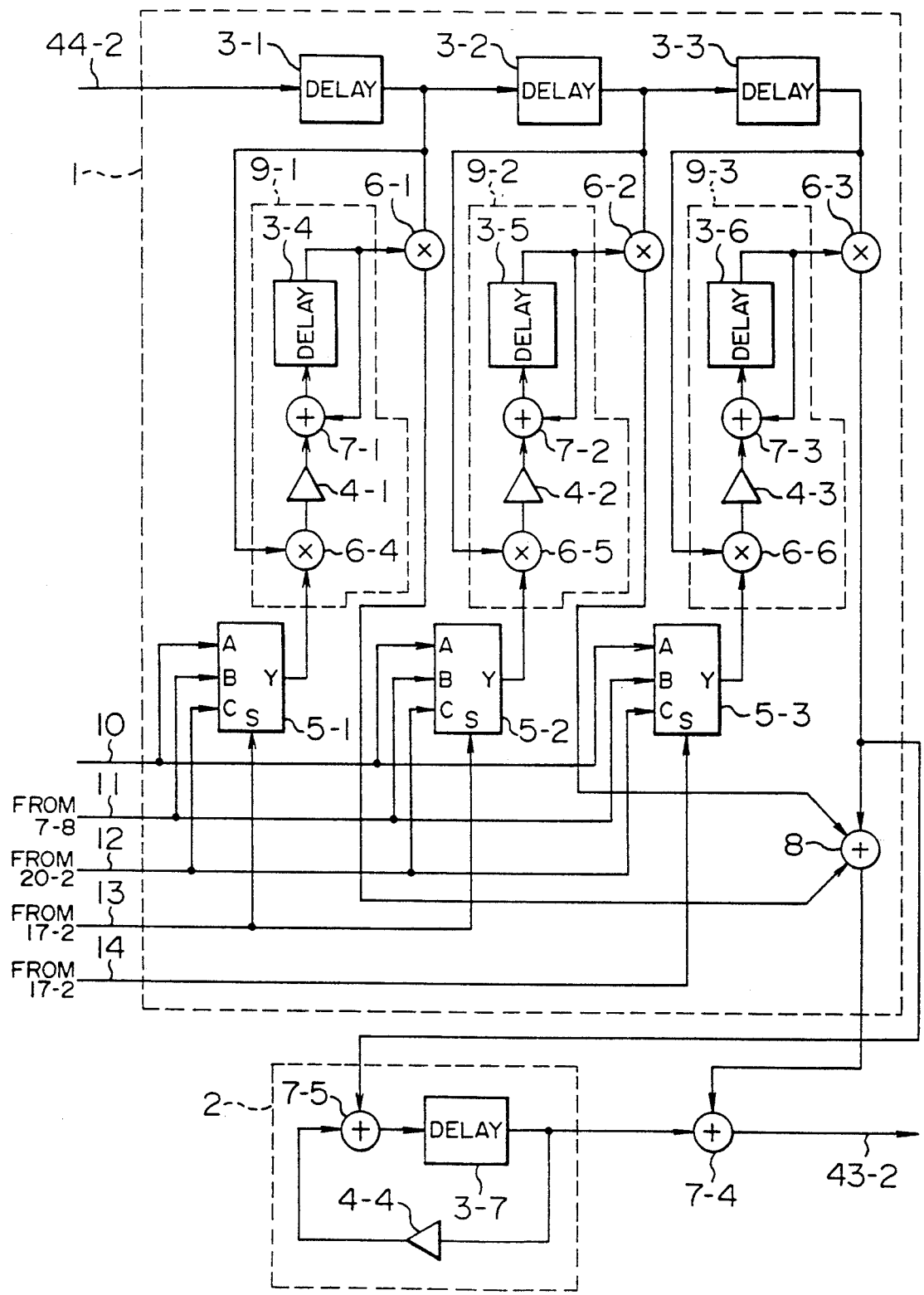
FIG. 1 is a block diagram of an arrangement of an echo canceller in accordance with a transmission system of an embodiment of the present invention.

Shown in FIG. 1 is a structure of the echo canceller 15-2 in FIG. 2. The echo canceller 15-2 comprises a first echo replica generator 1 for generating an echo replica for canceling echo components of a finite time corresponding to the number of delay circuits, a second echo replica generator 2 for generating an echo replica for canceling echo components following the finite time, and an adder 7-4 for adding the outputs of the first and second echo replica generators 1 and 2 together.

The first echo replica generator 1 is made of an adaptive FIR type digital filter. Accordingly, the echo replica generator 1 may be called and FIR type echo canceller. In the illustrated embodiment, the echo replica generator 1 includes three delay circuits 3-1, 3-2 and 3-3 which are connected in cascade and function to sequentially delay the encoded signal 44-2 received from the coder 16-2 in FIG. 2. A delay of each of the delay circuits is equal to one data period of data transmission. For example, in a subscriber line data transmission system, one data period is 12.5 micro-seconds. An output of the delay 3-1 is guided to a multiplier 6-1 to be multiplied by a coefficient received from a tap coefficient generator 9-1. Similarly, an output of the delay 3-2 is multiplied at a multiplier 6-2 by an output of a tap coefficient generator 9-2, and an output of the delay 3-3 is multiplied at a multiplier 6-3 by an output of a tap coefficient generator 9-3 respectively. Outputs of the multipliers are added together at an adder 8, the output of which is then used as an output of the first means 1.

The tap coefficient generators 9-1, 9-2 and 9-3 calculate their coefficients by their suitable methods in accordance with their respective data transmission stages, that is, the stage of starting transmitting data from the local terminal, the stage of receiving a transmit signal from the remote terminal which starts its transmission in response to a reception of the data from the local terminal, and the stage of detecting a synchronization pattern from the remote terminal to determine the phase of the received signal. As a result, the respective tap coefficients to be multiplied by the outputs of the plurality of filter links are suitably converged so that the output of the adder 8 can cancel the finite time components of an echo generated at the 2-wire/4-wire converter 21-2. The converging operation of the tap coefficients as well as the structures of the tap coefficient generators therefor and the circuits attached thereto will be detailed in the following description.

Meanwhile, the second echo replica generator 2 is made of a primary recursive filter which receives one of the tap outputs of the first echo replica generator 1. Thus, the echo replica generator 2 may be called an IIR type echo canceller. The echo replica generator 2 has an adder 7-5 connected to the output of the multiplier 6-3, a delay circuit 3-7 for applying a delay corresponding to one data period to an output of the adder, and a gain controller 4-4 for providing a predetermined gain to an output of the delay 3-7. An output of the gain controller 4-4 is fed back to the adder 7-5 as its other input so that the delay circuit 3-7 outputs an echo replica. It is most preferable, as in the illustrated embodiment that the second echo replica generator 2 is arranged to generate the echo replica with use of the tap output received from the last one of the plural stages of filter links in the first echo replica generator 1. However, such an arrangement using another tap output of the echo replica generator 1, in particular, the tap output received from one of the filter links close to the last stage, may be employed if necessary. Filter parameters of the echo replica generator 2, with respect to the transmit signal, depend on the gain of the gain controller 4—4 and on the tap coefficient of the employed tap output (which corresponds to the output of the multiplier 6-3, in the present embodiment). The former, in the present embodiment, is fixed so that a filter time constant corresponds approximately to the time constant of the transformer and terminates impedance of the 2-wire/4-wire converter 21-2. The latter is suitably determined according to the tap coefficient generator 9-3.

Explanation will next be made as to the structures and operations of the tap coefficient generators and circuits attached thereto. The tap coefficient generator 9-1 comprises a multiplier 6-4 for multiplying the output of the delay circuit 3-1 by a signal selected at a selector 5-1, a gain controller 4-1 for providing a predetermined gain to an output of the multiplier 6-4, an adder 7-1 and a delay circuit 3-4 connected in a loop form for performing an integrating operation over an output of the gain controller 4-1. The gain of the gain controller, 4-1 though not specifically determined, is set to be preferably about 1/4000 so that the output of the tap coefficient generator 9-1 can be made sufficiently small in variation and a time necessary for the convergence can be secured. Similarly, the tap coefficient generator 9-2 comprises a multiplier 6-5, a gain controller 4-2, an adder 7-2 and a delay circuit 3-5; and the tap coefficient generator 9-3 comprises a multiplier 6-6, a gain controller 4-3, an adder 7-3 and a delay circuit 3-6. Among these tap coefficient generators, the tap coefficient generator 9-1 for providing a tap coefficient to the first stage tap output and the tap coefficient generator 9-2 for providing a tap coefficient to the second stage tap output define only the filter parameters of the FIR type echo canceller 1. Meanwhile, the tap coefficient generator 9-3 for providing a tap coefficient to the last stage tap output defines the filter parameters of the IIR type echo canceller 2. Therefore, a selector 5-3 for selecting one of the input signals to be applied to the multiplier 6-6 is operated in an operational mode different from the selectors 5-1 and 5-2 for selection of one of their input signals to be applied to the multipliers 6-4 and 6-5 respectively. More specifically, the selectors are connected at their input A to a signal 10 of zero level, at their input B to a signal 11 received from the adder 7-8 (see FIG. 2), and at their input C to a signal 12 received from the net echo cancel error estimater 20-2 (see FIG. 2), respectively. The selectors 5-1 and 5-2 select their input signals on the basis of a control signal 13 received from the controller 17-2 (see FIG. 2), while the selector 5-3 selects its input signals on the basis of another control signal 14 received from the circuit 17-2 (see FIG. 2).

Figure 3:
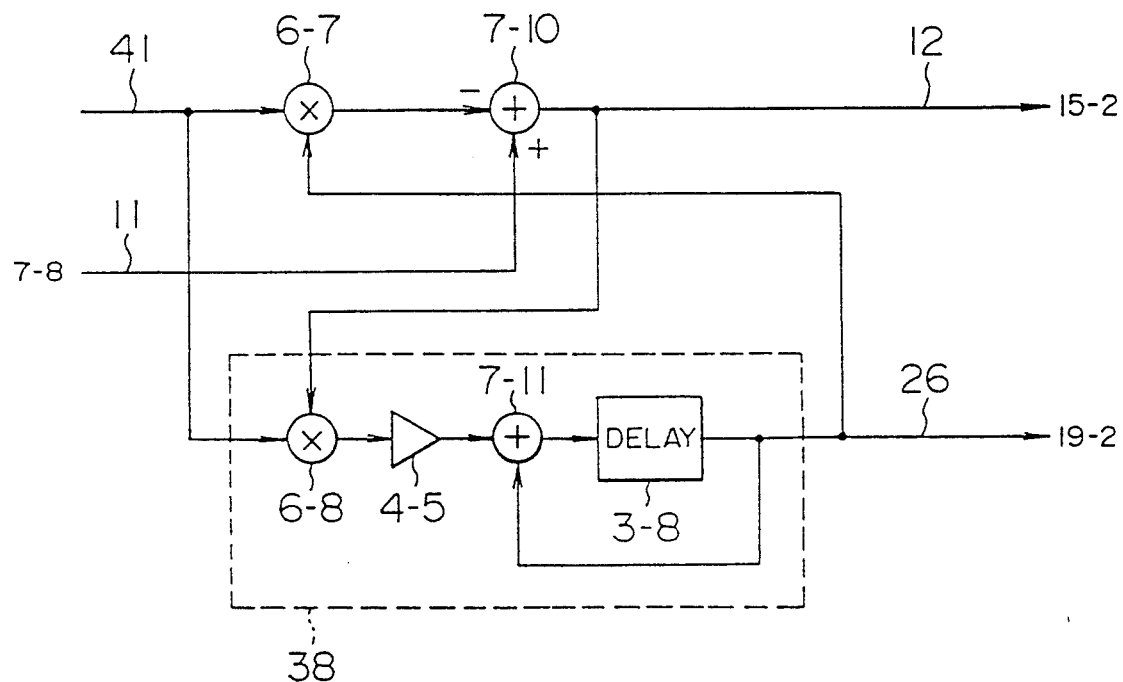
FIG. 3 is a block diagram of a structure of a net echo cancel error estimater in the embodiment.

FIG. 3 shows a detailed structure of the net echo cancel error estimater 20-2. The output 11 of an adder 7-8 equalized by the output of the equalizer 18-2 corresponds to a difference between the received signal and the echo replica output of the echo canceller 15-2, the difference of which will be referred to as the echo cancel error signal, hereinafter. The net echo cancel error estimater 20-2 receives the output of the slicer 19-2 and the echo cancel error signal 11, and outputs the error signal 12 corrected based on an estimated value of the transmit signal received from the remote terminal and also outputs a far end signal level 26. The net echo cancel error estimater 20-2 comprises a far end signal level estimator 38, a multiplier 6-7 and an adder 7-10 for correcting the echo cancel error signal 11. The far end signal level estimator 38 is made up of a multiplier 6-8 for performing multiplying operation of an output 41 of the slicer 19-2 and the error signal 12 corrected based on the estimated value of the transmit signal received from the remote terminal, a gain controller 4-5 for providing a predetermined gain to an output of the multiplier 6-8, an adder 7-11 and a delay circuit 3-8 for performing integrating operation over an output of the gain controller 4-5.

Explanation will then made as to the operation of the net echo cancel error estimater 20-2. First, the multiplier 6-7 calculates a product of the slicer output 41 and the far end signal level 26. An output of the multiplier 6-7 corresponds to the estimated value of the transmitted signal received from the remote terminal at the then sampling point. The adder 7-10 subtracts the estimated value from the echo cancel error signal 11. The output 12 of the adder 7-10 corresponds to the error signal subjected to a correction of the components of the transmitted signal received from the remote terminal, that is, the error signal indicative of a difference between an echo replica which the echo canceller is to generate in a full duplex data transmission mode and an actually generated echo replica. The multiplier 6-8 calculates a product of the slicer output 41 and the error signal 12 subjected to the component correction of the transmitted signal received from the remote terminal. The output of the multiplier 6-8 is applied to the gain controller 4-5. The gain value of the gain controller 4-5, though not specifically defined, is set to be 1/2048 in the illustrated example, taking the convergence of the far end signal level estimator 38 into consideration. The adder 7-11 adds together the output of the gain controller 4-5 and the output of the delay circuit 3-8. The output of the adder 7-11 is applied to the delay 3-8. Such a series of operations as mentioned above are repeated to provide the far end signal level 26 as the output of the far end signal level estimator 38.

The operation of the circuits of FIGS. 1 and 2 in different phases or stages of the data communication starting sequence, in particular, the operations of the selectors 5-1, 5-2 and 5-3 will be explained by referring to FIG. 5.

The first phase of the data transmission starting sequence is represented by a time slot 71 in FIG. 5. The first phase corresponds to a duration from issuance of a transmission start command from the local terminal to the convergence of the echo canceller 15-2 to a certain extent. In this duration, the control signals 13 and 14 both specify the selection of the input B. Thus, the selectors 5-1, 5-2 and 5-3 all select the echo cancel error signal 11. This results in that the tap coefficient generators 9-1, 9-2 and 9-3 sequentially update their tap coefficients to be multiplied by respective filter link signals in such a manner that the absolute value of the echo cancel error signal 11 becomes small. In this duration, only the signal to be transmitted from the local terminal is present and the signal received from the remote terminal is not present.

Then, when a convergence detection signal 46, to be explained later, is issued, this causes the data transmission starting sequence to be shifted to the second phase (time slot 72). The second phase is a duration for waiting for the reception of a signal from the remote terminal, in which duration the control signal 13 specifies the continuous selection of the input B, while the control signal 14 specifies the selection of the input A. Since the tap coefficient generator 9-3 for specifying the filter parameters of the IIR type echo canceller 2 receives the signal 10 of zero, the integration input becomes zero and thus the output of the tap coefficient generator 9-3 is held. The filter parameters of the IIR type echo canceller 2 are influenced greatly by a disturbance and thus, once the parameters are shifted from their optimum point, it requires a long time to restore them to their optimum state. In the second phase, any signal from the remote terminal is not detected but there may exist an already received signal which is mixed into the echo cancel error signal 11 as a disturbance. For the purpose of avoiding such a problem, the output of the tap coefficient generator 9-3 is held as mentioned above. Meanwhile, the outputs of the tap coefficient generators 9-1 and 9-2 for specifying only the filter parameters of the FIR type echo canceller 1 are sequentially corrected so that the absolute value of the FIR type echo canceller 11 becomes still small. For this reason, even when an erroneous setting is carried out due to a disturbance, the filter parameters of the FIR type echo canceller 1 can be converged into its optimum value in a short time.

Subsequently, when a reception detection signal 47 to be explained later is issued, the transmission starting sequence is brought into the third phase (time slot 73). In the third phase, the phase locked loop circuit 53-2, which has so far stopped its phase pull-in operation until the second phase, starts the phase pull-in operation in response to the control signal 54 received from the controller 17-2. The control signal 13 from the controller 17-2 specifies the selection of the input C. This results in the tap coefficient generators 9-1 and 9-2 receiving the output 12 of the aforementioned net echo cancel error estimater, that is, the error signal corrected based on the estimated value of the transmitted signal received from the remote terminal, and sequentially update their tap coefficients so that the absolute value of the error signal becomes small. Meanwhile, the control signal 14 still specifies the selection of the input A and thus the tap coefficient generator 9-3 still generates its output. The reason why the filter parameters of the IIR type echo canceller 2 is held in this way in the time slot 73 is as follows. The third phase is a transition duration during which the phase locked loop circuit 53-2 is converging to its optimum phase and the phase of the sampling time of the sampler 52-2 varies. Thus, there is a high possibility that the slicer 19-2 produces a discrimination error. Generation of such a discrimination error causes the estimated value of the transmit signal from the remote terminal generated based on the discrimination signal to also be erroneous, so that the error is mixed into the error signal 12 as a disturbance. In order to prevent the fluctuations of the filter parameters of the IIR type echo canceller 2 caused by the disturbance, the output of the tap coefficient generator 9-3 is still held. In this connection, for the purpose of preventing the mixing of the disturbance into the IIR type echo canceller 2 in the second and third phases, it is not required to hold the filter parameters completely. For example, the IIR type echo canceller 2 can be slowly converged by reducing the gain of the echo cancel error signal 11 and then applying it to the tap coefficient generator 9-3.

When a synchronization pattern detection signal 45, to be explained later, is then issued, the transmission starting sequence is shifted to the fourth phase (time slot 74). A control signal 54 causes the loop gain of the phase locked loop circuit 53-2 to be reduced to zero or a small value that is remarkably lower than that of the third phase. That is, in the fourth phase, synchronization is established between the local and remote terminals so that substantially no variation takes place in the sampling phase of the sampler 52-2. Accordingly, the possibility of generating a discrimination error in the slicer 19-2 is reduced. In this phase, the control signals 13 and 14 both specify the selection of the input C. As a result, the tap coefficient generators 9-1, 9-2 and 9-3 receives the error signal 12, whereby the filter parameters of the FIR type and IIR type echo cancellers 1 and 2 are sequentially updated so that the absolute value of the error signal 12 becomes small.

Major features in the filter converging procedure shown in FIG. 5 are:

(1) The converging operations of both of the FIR type and IIR type echo cancellers 1 and 2 are carried out in the first phase (time slot 71).

(2) In the duration (time slots 72 and 73) from the detection of the convergence to a certain extent to the establishment of the synchronization, the parameters of the IIR type echo canceller 2 are held or at least IIR type echo canceller 2 is slowly converged.

(3) In the duration (time slot 74) after the establishment of the synchronization with the remote terminal, both of the FIR and IIR type echo cancellers 1 and 2 again start their converging operation.

Therefore, the embodiment may be modified in various ways so long as it follows such a featured converging procedure, so that any disturbance to the IIR type echo canceller can be prevented and suitable convergence of the echo cancellers can be realized.

Figure 4:
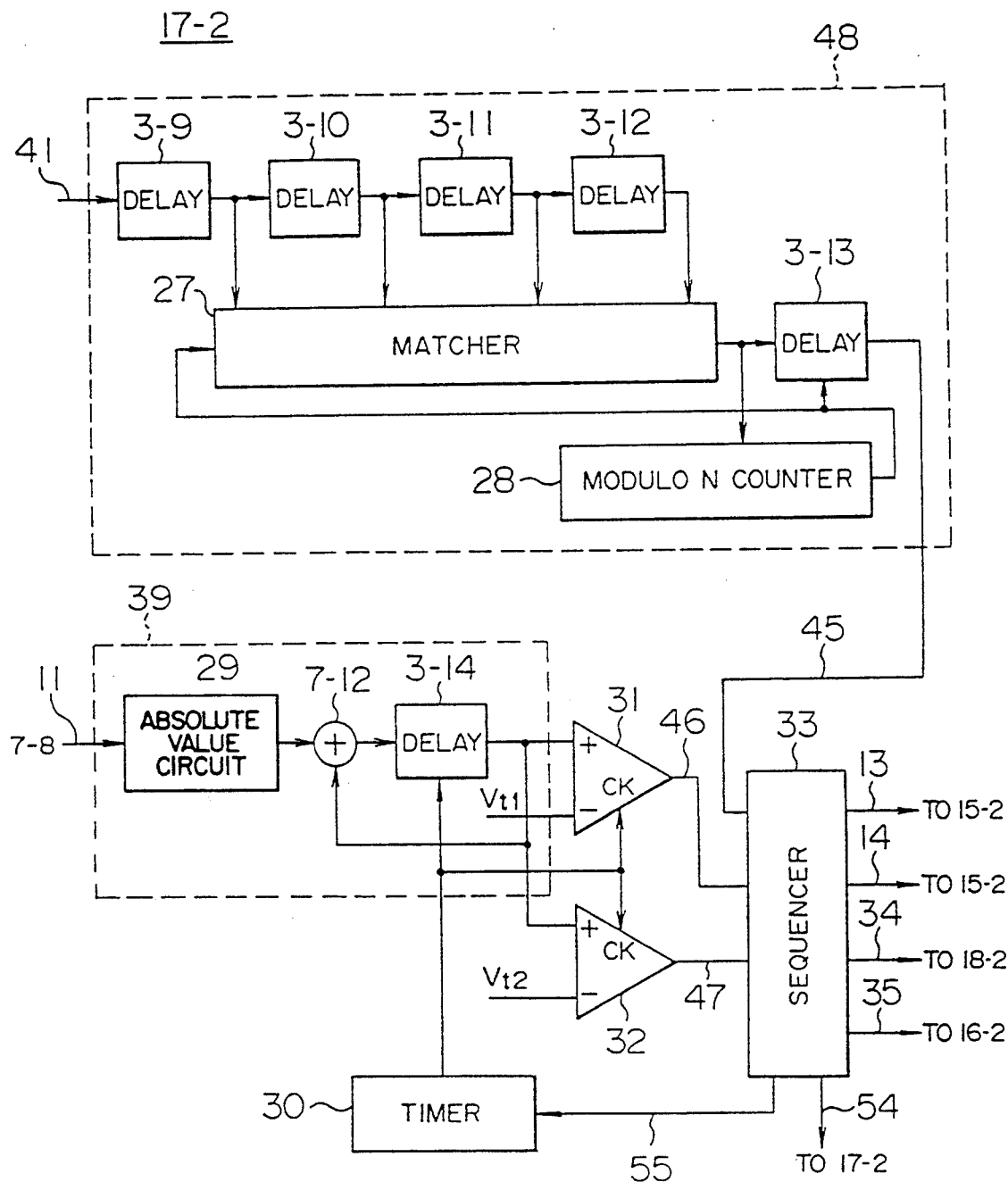
FIG. 4 is a block diagram of a structure of a controller in the embodiment.

FIG. 4 shows a detailed arrangement of the controller 17-2 for generating the control signals 13 and 14 according to the aforementioned first to fourth phases.

Explanation will first be directed to that part of the controller 17-2 which generates the convergence detection signal 46. The echo cancel error signal 11 received from the adder 7-8 of FIG. 2 is connected to an integration circuit 39 which comprises an absolute value circuit 29 for receiving the echo cancel error signal 11, an adder 7-12 and a delay circuit 3-14 connected in a loop. An output of the absolute value circuit 29 is sent to the adder 7-12. A transmission start signal 55 causes a timer 30 to be started and to generate an output signal for a predetermined time duration, e.g., 3 msec. At a time point from which the duration starts, the output of the delay circuit 3-14 is reset, so that, at a time point at which the duration ends, the output of the integration circuit corresponds to the integration of absolute value of the echo cancel error signal 11 within the above predetermined period. A comparator 31 compares the then integrated value with a threshold value Vt1. When the integrated value is smaller than the threshold value, the comparator 31 generates the convergence detection signal 46. In this way, it is judged that the echo canceller 15-2 has converged. The judgement result is transmitted from the comparator 31 to a sequencer 33 and control is shifted to the second phase for detection of the received signal. When the integrated value is larger than the threshold Vt1, the control signal 55 issued from the sequencer 33 to the timer 30, so that the timer 30 is again started and the above judgement is repeated until the convergence detection signal 46, is generated.

In the second phase, the sequencer 33 again starts the timer 30 repetitively for a comparator 32 to monitor the presence or absence of the transmit signal received from the remote terminal. When the transmit signal is transmitted from the remote terminal to the local terminal, the absolute value of the echo cancel error signal 11 is abruptly increased. Thus, the comparator 32 compares the integrated value with a threshold value Vt2 in the constant duration and when the integrated value is larger than the threshold value, the comparator 32 issues an output as the reception detection signal 47. The reception detection signal 47 is also sent to the sequencer 33 to shift the sequence to the third phase.

The shift to the third phase causes the sequencer 33 to issue an equalizer control signal 34 to the equalizer 18-2 to start its equalizing operation. The sequencer 33 also issues the control signal 54 to the phase locked loop circuit 17-2 to start the operation necessary for pulling the sampling phase of the sampler 52-2 into its optimum phase. The slicer 19-2 discriminates the equalized signal. The output 41 of the slicer 19-2 is utilized as a user data and is also applied to a synchronization detector 48. The synchronization detector 48, which comprises delay circuits 3-9 to 3-13, a matcher 27 and a modulo N counter 28, detects a synchronization pattern contained in the received data. The synchronization pattern, though not specifically defined here, is +3, +3, −3, −3, −3, +3, −3, +3, +3, for example, when the pattern is defined based on specifications by the American National Standards Institute. In this case, +3 or −3 is the normalization of amplitude value of a code on a line. FIG. 4 shows a synchronization detector for detecting a 4 symbol synchronization pattern for convenience of explanation. The output 41 of the slicer 19-2 is sequentially delayed at the delay circuits 3-9 to 3-12 at their reception intervals. Outputs of the delays 3-9 to 3-12 are applied to the matcher 27. The matcher 27 verifies the matching between the received output of the slicer 19-2 and a predetermined synchronization pattern at intervals determined by the modulo N counter 28. When finding the matching therebetween, the matcher 27 generates an output of "1". The output of the matcher 27 is held at a register. The holding time is controlled by the output of the modulo N counter 28. Thus, when the output of the matcher 27 matches with the synchronization pattern at intervals of the indication of the modulo N counter 28, the register always generates an output of "1", indicating that the synchronization detector detects the synchronization. When the output of the matcher 27 does not match with the synchronization pattern at intervals of the indication of the modulo N counter 28, on the other hand, the register generates an output of "0", indicating that the detector fails to detect the synchronization. The signal 45, indicative of the detection of the synchronization, is applied to the sequencer 33 to thereby shift the sequence to the fourth phase. In this case, N in the modulo N counter 28 denotes 120 when the standards of the American National Standards Institute is employed.

As has been explained in the foregoing, in accordance with the present embodiment, the respective converging methods of the FIR and IIR type filters forming the echo cancellers are suitably selected in the respective phases of the data communication starting sequence. Since the employment of the IIR type filter enables reduction of the number of taps in the FIR type filter, the circuits of the terminal apparatus can be suitably made in the form of an integrated circuit.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A full duplex data transmission terminal apparatus having a hybrid circuit connecting transmitting and receiving lines to a 2-wire transmission line for performing data communication with a remote terminal on a full duplex transmission basis, comprising:

an echo canceler for canceling an echo generated on the receiving line by a first digital signal applied on the transmitting line, said echo canceler including an FIR type filter for receiving the signal from the transmitting line to generate a first component replica of said echo, an IIR type filter for receiving one tap output of said FIR type filter to generate a second component replica of said echo, and coupling means for subtracting the output first and second component replicas of said echo of said FIR type and IIR type filters, respectively, from the signal on the receiving line;

slicer means connected to an output of said coupling means for discriminating a second digital signal transmitted from said remote terminal and received at said receiving line;

filter converging means for converging said FIR and IIR type filters on the basis of an error signal obtained from the output of said coupling means;

data communication starting step detection means, having received the outputs of said coupling means and said slicer means, for monitoring whether or not convergence of said echo canceler is attained relative to a threshold value and whether or not a synchronization pattern is present in an output signal train of said slicer means; and control means for setting a duration from start of transmission of said first digital signal to detection of the convergence, a duration until detection of said synchronization pattern and a duration after the detection of said synchronization pattern to be first, second and third durations respectively, and for further enabling the converging operation of both said FIR and IIR type filters by said filter converging means in said first and third durations and for stopping the converging operation in at least said IIR type filter in said second duration.

2. A full duplex data transmission terminal apparatus as set forth in claim 1, wherein said filter converging means includes a plurality of tap coefficient generators for calculating their respective tap coefficients, a plurality of tap outputs of said FIR type filter according to said error signal, said control means holding one of said tap outputs of said plurality of tap coefficient generators connected to said IIR filter in said second duration.

3. A full duplex data transmission terminal apparatus as set forth in claim 1, wherein said data communication starting step detection means, when an integrated value indicative of integration of an absolute value of said error signal with respect to a predetermined time is smaller than said first threshold, determines that the convergence of said echo canceler is attained relative to a threshold value and detects the end of said first duration.

4. A full duplex data transmission terminal apparatus as set forth in claim 1, further comprising error correction means for creating an estimated value of a far end signal based on an output of said slicer means and for correcting said error signal based on said estimated value, and wherein said filter converging means converges said FIR and IIR type filters according to an output of said error correction means.

5. A full duplex data transmission terminal apparatus having a hybrid circuit connecting transmitting and receiving lines to a 2-wire transmission line for performing data communication with a remote terminal on a full duplex transmission basis, comprising:

a sampler for sampling the signal on the receiving line, thereby providing a sampled signal;

an echo canceler for canceling an echo generated on the receiving line by a first digital signal applied on the transmitting line, said echo canceler including an FIR type filter for receiving the signal from the transmitting line to generate a first component replica of said echo, an IIR type filter for receiving one tap output of said FIR type filter to generate a second component replica of said echo, and coupling means for subtracting the output first and second component replicas of said echo of said FIR type and IIR type filters, respectively, from the signal on the receiving line;

slicer means connected to an output of said coupling means for discriminating a second digital signal transmitted from said remote terminal and receiving at said receiving line;

a phase locked loop circuit for controlling a sampling phase of said coupling means and said slicer means;

filter converging means for converging said FIR and IIR type filters on the basis of an error signal obtained from the output of said coupling means;

data communication starting step detection means, having received the outputs of said coupling means and said slicer means, for monitoring whether or not convergence of said echo canceler is attained relative to a threshold value and whether or not a synchronization pattern is present in an output signal train of said slicer means; and control means for setting a duration from start of transmission of said first digital signal to detection of the convergence, a duration until detection of said synchronization pattern and a duration after the detection of said synchronization pattern to be first, second and third durations respectively, and for further enabling the converging operation of both said FIR and IIR type filters by said filter converging means in said first and third durations, for stopping the converging operation in at least said IIR type filter in said second duration, and for stopping said phase locked loop circuit or making a loop gain of said locked loop circuit smaller than that of the second duration and that of the third duration.

6. A full duplex data transmission terminal apparatus as set forth in claim 5, wherein said filter converging means includes a plurality of tap coefficient generators for calculating their respective tap coefficients a plurality of tap outputs of said FIR type filter according to said error signal, said control means for holding one of said tap outputs of said plurality of tap coefficient generators connected to said IIR filter in said second duration.

7. A full duplex data transmission terminal apparatus as set forth in claim 5, wherein said data communication starting step detection means, when an integrated value indicative of integration of an absolute value of said error signal with respect to a predetermined time is smaller than said first threshold, determines that the convergence of said echo canceler is attained relative to a threshold value and detects the end of said first duration.

8. A full duplex data transmission terminal apparatus as set forth in claim 5, further comprising error correction means for creating an estimated value of a far end signal based on an output of said slicer means and for correcting said error signal based on said estimated value, and wherein said filter converging means converges said FIR and IIR type filters according to an output of said error correction means.

9. A full duplex data transmission terminal apparatus having a hybrid circuit connecting transmitting and receiving lines to a 2-wire transmission line for performing data communication with a remote terminal on a full duplex transmission basis, comprising:

an echo canceler for canceling an echo generated on the receiving line by a first digital signal applied on the transmitting line, said echo canceler including an FIR type filter for receiving the signal from the transmitting line to generate a first component replica of said echo, an IIR type filter for receiving one tap output of said FIR type filter to generate a second component replica of said echo, and coupling means for subtracting the output first and second component replicas of said echo of said FIR type and IIR type filters, respectively, from the signal on the receiving line;

slicer means connected to an output of said coupling means for discriminating a second digital signal transmitted from said remote terminal and receiving at said receiving line;

error correction means for creating an estimated value of a far end signal based on an output of said slicer means and for correcting a first error signal issued from an output of said coupling means to form a second error signal;

data communication starting step detection means, having received the outputs of said coupling means and said slicer means, for monitoring whether or not convergence of said echo canceler is attained relative to a threshold value and whether or not a synchronization pattern is present in an output signal train of said slicer means; and filter convergence control means for setting a duration from start of transmission of said first digital signal to detection of the convergence, a duration until detection of said synchronization pattern and a duration after the detection of said synchronization pattern to be first, second and third durations respectively and for converging both of said FIR and IIR type filters according to said first error signal in said first duration, for stopping the convergence of at least said IIR type filter in said second duration, and for converging both FIR and IIR type filters according to said second error signal in said third duration.

10. A full duplex data transmission terminal apparatus as set forth in claim 9, wherein said filter convergence control means includes a plurality of tap coefficient generators for calculating tap coefficients for a plurality of tap outputs of said FIR type filter respectively and a plurality of selection means for selectively connecting either one of said first and second error signals and a zero signal to an associated one of said plurality of tap coefficient generators according to an output of said data communication starting step detection means.

11. A full duplex data transmission terminal apparatus as set forth in claim 9, wherein said data communication starting step detection means further includes a signal reception detector for detecting when said second digital signal is received at said receiving line in said second duration, and said filter convergence control means converges said FIR type filter according to an output of said coupling means in a part of said second duration before generation of an output of said signal reception detector or according to said error signal after the generation of the output of said signal reception detector.

12. A full duplex data transmission terminal apparatus as set forth in claim 11, wherein said signal reception detector, an integrated value indicative of integration of an absolute value of an output of said coupling means with respect to a predetermined time is larger than a second threshold value, determines that said second digital signal is received at said receive line.

* * * * *